(12) United States Patent
Szwabowski et al.

(10) Patent No.: US 9,333,975 B2
(45) Date of Patent: May 10, 2016

(54) METHOD AND SYSTEM TO DETECT AND MITIGATE CUSTOMER DISSATISFACTION WITH PERFORMANCE OF AUTOMATIC MODE SELECTION SYSTEM

(71) Applicant: FORD GLOBAL TECHNOLOGIES, LLC, Dearborn, MI (US)

(72) Inventors: Steven Joseph Szwabowski, Northville, MI (US); Dimitar Petrov Filev, Novi, MI (US); Jianbo Lu, Northville, MI (US); Finn Tseng, Ann Arbor, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/034,642

(22) Filed: Sep. 24, 2013

(65) Prior Publication Data
US 2014/0025259 A1 Jan. 23, 2014

Related U.S. Application Data

(63) Continuation-in-part of application No. 13/021,745, filed on Feb. 5, 2011, now Pat. No. 8,600,614.

(51) Int. Cl.
*B60W 50/00* (2006.01)

(52) U.S. Cl.
CPC ........... *B60W 50/0098* (2013.01); *B60W 50/00* (2013.01); *B60W 2050/0078* (2013.01); *B60W 2050/0083* (2013.01); *B60W 2540/30* (2013.01); *B60W 2550/141* (2013.01); *B60W 2550/148* (2013.01); *B60W 2550/20* (2013.01)

(58) Field of Classification Search
CPC .................................................... B60W 30/182
See application file for complete search history.

(56) References Cited

U.S. PATENT DOCUMENTS

| | | |
|---|---|---|
| 5,123,301 A | 6/1992 | Hagele et al. |
| 5,410,476 A * | 4/1995 | Iizuka ............................. 701/56 |
| 6,855,090 B2 | 2/2005 | Tabata et al. |
| 6,879,898 B2 | 4/2005 | Ghoneim et al. |
| 7,009,356 B2 * | 3/2006 | Tanida ........................... 318/483 |
| 7,124,027 B1 | 10/2006 | Ernst, Jr. et al. |
| 7,177,760 B2 | 2/2007 | Kudo |
| 7,206,673 B2 | 4/2007 | Yamamura et al. |
| 7,349,776 B2 | 3/2008 | Spillane et al. |
| 7,403,842 B2 | 7/2008 | Yamamura et al. |
| 7,440,844 B2 | 10/2008 | Barta et al. |
| 7,590,481 B2 | 9/2009 | Lu et al. |
| 7,759,819 B2 * | 7/2010 | Michiyama et al. ......... 307/10.8 |
| 7,783,426 B2 | 8/2010 | Kato et al. |
| 7,904,221 B2 | 3/2011 | Oikawa et al. |
| 8,116,915 B2 * | 2/2012 | Kempton ...................... 700/291 |
| 8,155,843 B2 | 4/2012 | Takeda |
| 8,155,868 B1 | 4/2012 | Xing et al. |
| 8,284,038 B2 | 10/2012 | Wu |

(Continued)

FOREIGN PATENT DOCUMENTS

WO WO-2013007800 A1 1/2013

*Primary Examiner* — Nicholas Kiswanto
(74) *Attorney, Agent, or Firm* — Frank A. MacKenzie; Brooks Kushman P.C.

(57) ABSTRACT

A method for controlling a vehicle includes automatically activating a first mode of operation of a vehicle, determining if a driver does not prefer the automatically activated first mode of operation, and automatically transitioning to a second mode of operation based on the determination.

17 Claims, 4 Drawing Sheets

(56) References Cited

U.S. PATENT DOCUMENTS

| | | |
|---|---|---|
| 8,346,456 B2 | 1/2013 | Aleksic et al. |
| 2004/0084010 A1* | 5/2004 | Kurtz et al. ............ 123/295 |
| 2005/0055150 A1* | 3/2005 | Uhler et al. ............ 701/93 |
| 2006/0052917 A1 | 3/2006 | Schwarzhaupt et al. |
| 2007/0203614 A1* | 8/2007 | Strenkert ............ 701/1 |
| 2007/0282500 A1 | 12/2007 | Kouchi et al. |
| 2012/0203424 A1 | 8/2012 | Filev et al. |
| 2012/0293317 A1* | 11/2012 | Hanna et al. ............ 340/441 |
| 2013/0035837 A1 | 2/2013 | Johansson et al. |
| 2013/0096792 A1 | 4/2013 | Maier et al. |

\* cited by examiner

METHOD AND SYSTEM TO DETECT AND MITIGATE CUSTOMER DISSATISFACTION WITH PERFORMANCE OF AUTOMATIC MODE SELECTION SYSTEM

BACKGROUND

This application relates generally to vehicle control systems and more particularly to an automatic mode selection system.

Vehicles have become more and more automated as computerized systems have become more sophisticated. As such, modes of operation of the vehicle can be preprogrammed and automatically implemented by the driver, depending on the type of driving that is being experienced. For instance, a "normal" mode may include what is commonly understood as a normal or more traditional driving mode in which the driver manually operates the brakes, accelerator, and steering wheel. In a "comfort" mode, certain aspects of driving are turned over to the computerized system to offload some of the effort from the driver and simplify the driving effort. Likewise, a "sport" mode may be implemented when a driver may desire a more responsive feel to the vehicle.

However, from time to time, automated operation might provide an action based on an operating context which might not meet the complete needs of the user. When this happens, it may dissatisfy the user. For example, in the case of the automatic performance mode selection system, this could mean that the system is placed in comfort mode while the driver actually would prefer normal mode operation. The expectation is that when a mode is applied that the driver disapproves of that this would cause them to behave differently than they had prior to the activation of the transition.

Thus, there is a need to better infer behavior of the driver to prevent switching from mode to mode, or switching out of a desired mode of operation.

SUMMARY

A method for controlling a vehicle includes automatically activating a first mode of operation of a vehicle, determining if a driver does not prefer the automatically activated first mode of operation, and automatically transitioning to a second mode of operation based on the determination.

A mode-shifting system for a vehicle includes a controller configured to automatically establish a mode of operation, monitor driver activity and determine if a driver does not prefer the established mode of operation, and automatically switch to a different mode if the inconsistent behavior is detected.

A non-transitory computer-readable medium tangibly embodying computer-executable instructions includes steps to automatically activate a first mode of operation of a vehicle, determine if a driver does not prefer the automatically activated first mode of operation, and automatically transition to a second mode of operation based on the determined driver preference.

DETAILED DESCRIPTION

Figure 1:
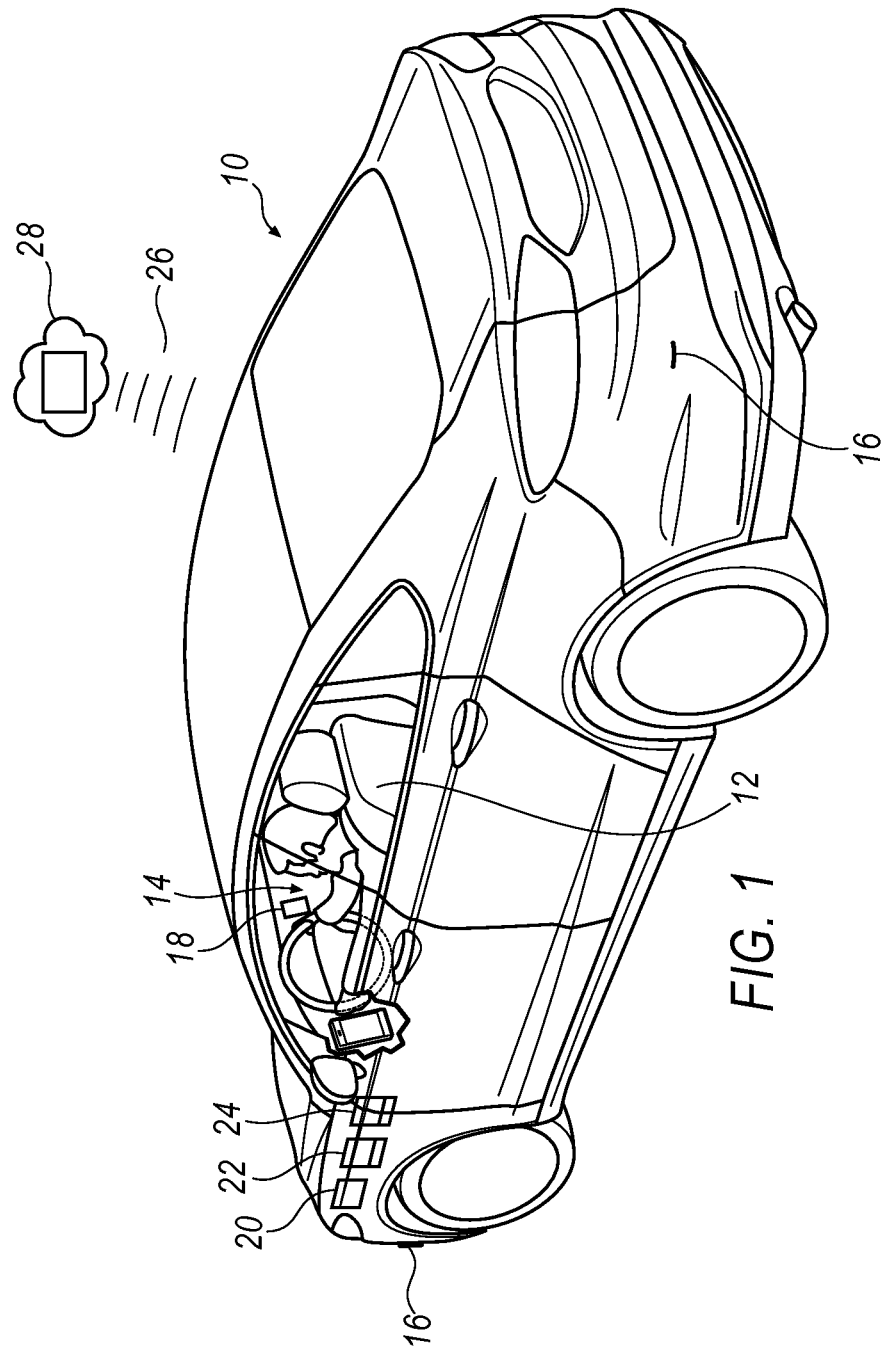
FIG. 1 illustrates a vehicle that includes features that are incorporated into the disclosed system and method.

FIG. 1 shows a vehicle 10 having features that are incorporated into the disclosed system and method. Vehicle 10 is illustrated as a typical 4-door sedan, but may be any vehicle for driving on a road, such as a compact car, a pickup truck, or a semi-trailer truck, as examples. Vehicle 10 includes a seat 12 for positioning a driver. Vehicle 10 includes a dashboard 14 that typically includes control buttons or switches for activating various devices on vehicle 10. A steering wheel is positioned such that the driver can steer vehicle 10 while driving.

Vehicle 10 includes a number of features, which include but are not limited to an airbag system, various sensors 16 throughout vehicle 10, an audio/visual system 18, a GPS 20, and a communication system 22 that includes but is not limited to a WiFi system, an embedded modem, and a dedicated short-range communication (DSRC) system. A DSRC uses one-way or two-way short- to medium-range wireless communication channels specifically designed for automotive use and a corresponding set of protocols and standards. A computer or computing device 24 is positioned within vehicle 10, which provides any number of features that include controlling engine and other vehicle parameters, monitoring vehicle operation (safety devices, tire pressure, etc.), interfacing with the driver via the audio/visual system 18, monitoring vehicle position via GPS 20, and providing map and directions to the driver using GPS information, to name a few. The audio and/or visual device 18 may provide warning to a driver or other occupant of a car of a hazard, for instance, may inform the driver of driving instructions, or may provide other features.

Communication system 22 is configured to operate wirelessly with systems external to vehicle 10. In one embodiment, signals are sent wirelessly 26 external to the vehicle, such as to a "cloud computing" device or collection of computers or computing devices 28. Signals may also be sent from communication system 22 via the WiFi system, the embedded modem, or DSRC to other devices external to the vehicle.

Figure 2:
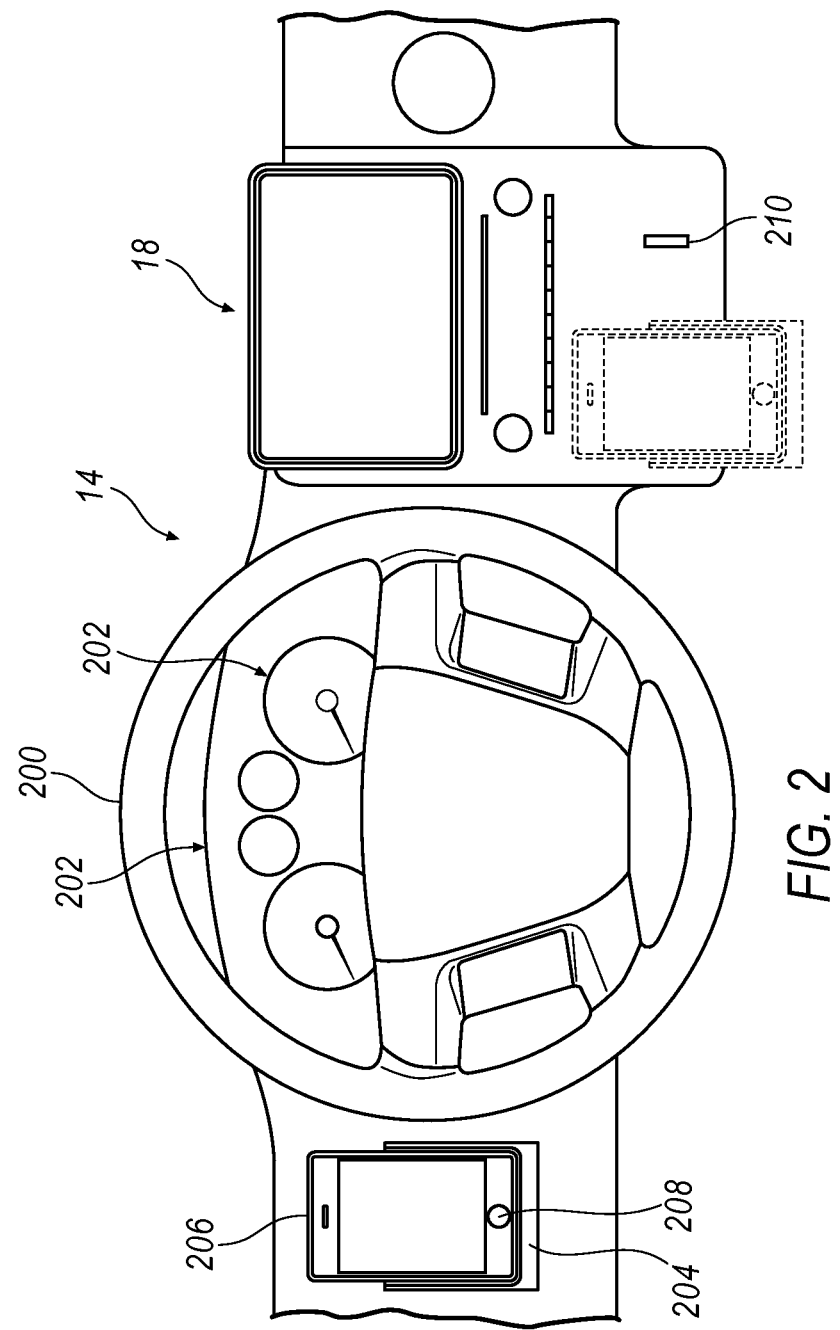
FIG. 2 illustrates a dashboard of a vehicle.

Referring to FIG. 2, dashboard 14 includes a steering wheel 200 and instruments 202 that display vehicle speed, engine speed (e.g., in a tachometer), and the like. Dashboard 14 includes a holder 204 to which a cellphone or cellular telephone 206 is attached. Holder 204 includes any device for holding cellphone 206, such as a clamping device, Velcro, or a device with slots into which cellphone 206 slides, as examples. In an alternative embodiment, holder 204 is not provided and cellphone 206 may be simply placed in the vehicle next to the driver.

In addition to conventional cellphone communication capability (e.g., for telephone calls), cellphone 206 includes a wireless communication device such as Bluetooth or other known methods for communicating with a local device, such as computing device 24 of vehicle 10. Such may be useful for sending music or other information for use on a sound system of vehicle 10, or for communicating with a safety system of vehicle 10, as examples.

Cellphone 206, in one embodiment, is a "smartphone" that is capable of executing software applications, or "apps" that interact with the internet via a touchscreen or other known methods. Cellphone 206 includes a camera 208 and at least one of a keypad and display. As such, a driver or other occupant of the vehicle may communicate wirelessly with computers that are external to the vehicle using computing device 24 and interfacing therewith by using an "app" on cellphone 206, and/or by using audio/visual system 18. Such communication may be with an icon-driven touchscreen, voice-recognition, or by using a text feature, as examples. Communication may be via computing device 24 to computing devices 28 or to another computer, such as a computer at an automobile dealership.

That is, an occupant of a vehicle may communicate with computers external to the vehicle via any number of means, including but not limited to a cell phone and/or via a communication system that is part of the vehicle and may be incorporated into a dashboard thereof. Communication is wireless and two-way and may include cloud computing devices and/or a computer device affiliated with a business or industry.

Figure 3:
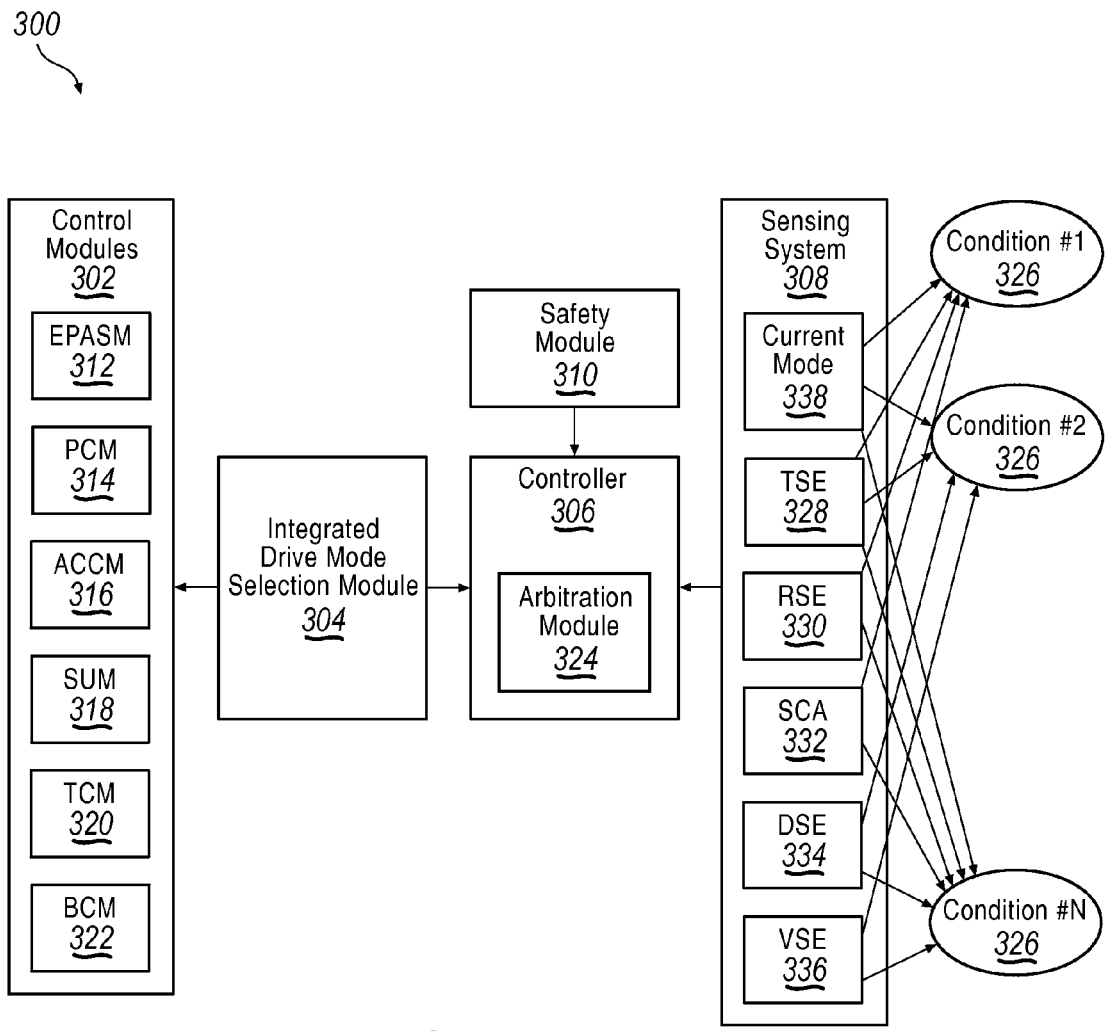
FIG. 3 illustrates an exemplary embodiment of a method for integrated vehicle control.

FIG. 3 illustrates an exemplary integrated vehicle control system 300 that can be implanted in vehicle 10. The system 300 includes a set of control modules 302 controlling vehicle components or subsystems, and each control module may be switchable among different operational settings or modes such as normal, comfort, and sport. To determine an appropriate setting for each control module 302, the present disclosure employs an integrated drive mode selection module 304 having a set of drive modes including automatic, proactive, or other known drive modes. A driver may manually select one of the known drive modes, such as normal, comfort, or sport, and an appropriate corresponding setting is provided to the control modules 302. Alternatively, the driver may select the automatic or proactive mode where a controller 306 automatically determines the drive mode. To this end, the controller 306 is coupled to a sensing system 308 to identify a set of conditions associated with the driver, vehicle, and surroundings. These conditions assist in determining an appropriate drive mode. In addition, the system 300 includes a safety module 310 that ensures that the drive mode identified by the controller 306 is safe for the driver and vehicle.

The control modules 302 include vehicle subsystems that provide assistance during driving. Some of the known control modules 302 employed in the vehicle include an electronic power-steering assist system module (EPASM) 312, a power train control module (PCM) 314, an adaptive cruise control module (ACCM) 316, and a transmission control module (TCM) 320. The EPASM 312 is designed to use an electric motor to reduce effort by providing steering assist to the driver. PCMs 314 are conventional control modules employed by vehicles that generate power and facilitate control coordination between one or more of the engine, transmission, driveshaft, or final drive. Further, a module that automatically controls the speed of a vehicle is referred to as the ACCM 316. TCM 320 detects engine load and vehicle speed to decide a gear position to be established in the transmission. The system 300 includes other control modules 302 that provide assistance in controlling the suspension and brakes, referred to as a suspension control module SUM 318 and a brake control module BCM 322, respectively. It is contemplated that, although the present disclosure illustrates only a limited number of control modules 302, it is understood that the vehicle might include any of the numerous control systems known to those in the art.

In addition, each control module 302 may be switchable among two or more operational settings such that its behavior can be modified. In general, each control module 302 may present a set of settings such as comfort, normal, and sport. When driving at substantially low speed, the EPASM 312 should operate at comfort settings to reduce driver steering efforts. Medium speed includes normal settings, and a sport setting may be preferable for high speed driving. Based on the driving conditions, each control module 302 is required to switch to an appropriate mode setting through a corresponding actuator. Conventionally, the individual actuators are activated independently to adapt to the driving conditions, for example, SUM 318 adapts to a comfort mode when driving over a potholed, or rough, road.

The present disclosure describes controlling the control modules 302 through the integrated drive mode selection module 304. The integrated drive mode selection module 304 manages coordination among the settings of the control modules 302 through a set of drive modes such as manual, comfort, sport, and other modes known in the art. These modes are commonly known and will not be explained in detail in the present disclosure, but it is understood that each mode corresponds to respective vehicle suspension settings (stiffness, real-time damping), acceleration response, and steering wheel power assist, engine responsiveness, transmission shifting point, and traction control, as examples. The driver may manually select a desired drive mode through a user interface such as audio/visual system 18 or cellphone 206, as described above. The specific nature of the user interface will be governed by conventional design choices for controls and instruments in a specific vehicle. A low-cost, utilitarian vehicle might employ manual control such as pushbuttons. A vehicle aimed at a more style-conscious market could use a touchscreen system in either event, or with any other control systems, the user interface allows the driver to modify the settings for each control module 302. Further, the system includes a safety mode, which may not be subjected to driver's selection, but is automatically activated based on driver, vehicle and surrounding awareness, and ensures that the driver and vehicle are safe for the driving conditions. It should be evident that modifying the control module's settings should not impose a threat to the vehicle or driver. As a result, the safety mode overrides the driver's selected mode if the driver selected mode is not deemed as safe as the safety mode elected.

Apart from the known drive modes, the integrated drive mode selection module 304 includes an automatic and a proactive mode. Upon activating the automatic mode, an appropriate drive mode is automatically determined and, subsequently, an appropriate setting for each control module 302 is provided. To this end, the controller 306 utilizes a decision logic that monitors a set of conditions associated with the driver and surroundings to determine the drive mode. The decision logic provides context aware selection of the drive mode, which is optimal or most appropriate for the current driving conditions including driver's behavior, road condition, vehicle states, traffic scenarios, and the like.

Sensing system 308 includes sensors and monitors, and detects information associated with the vehicle, driver, and surroundings. The sensing system 308 may include known detection, known computation or information generated from measuring devices employed in vehicles to gather data that may be used for current drive mode modification. The sensing system 308 may also gather information available through known vehicle subsystems, such as steering systems, parking assistance system, and navigation system.

The controller 306 may be a microprocessor-based control system adapted for actively controlling the control modules 302, using, for instance, computer or computing device 24. The controller 306 may include appropriate input and output circuits of a known type for receiving input signals and for transmitting the various commands to the actuators associated with the control modules 302. Sensing system 308 provides detected information to the controller 306, and the driver provides mode preferences to the controller 306 through the integration drive mode selection module 304.

Using these inputs, the controller 306 determines an appropriate drive mode. An arbitration module 324 performs this determination step using the decision logic.

The controller 306 utilizes the output of the sensing system 308 to estimate data associated with the driver, vehicle and surroundings. The controller estimations may broadly include, but are not limited to, traffic state estimation (TSE) (heavy, normal, low) 328, road state estimation (surface, grade, highway, or city road) 330, safety condition assessment 332, driver state estimation 334, and vehicle state estimation 336. Another parameter that may affect drive mode selection is the current mode 338.

Driver state estimation 334 refers to the determination of information regarding the driver's driving state such as driving workload, behavior (cautious, economical, sporty), intent (understeer, oversteer or neutral turning, straight line driving, etc.), and vehicle control capabilities (age, experience, expertise). To provide driving comfort, driver's state information is gathered to identify the drive mode that may be preferred by the driver. It should be understood that driver's state may be estimated by observing the frequency of driver's control applications and the dynamic response of the vehicle and its subsystems under the influence of the driver's control applications. The driver's control applications could be any one or more of braking, steering, throttling, and shifting. Moreover, surrounding conditions might be observed to define driver's workload. For example, heavy traffic and snowfall may induce high workload on the driver. In addition, a line of sight sensor may be utilized to identify driver's attentiveness or control capabilities. For example, a driver looking away from the current driving lane determines control capabilities. A driver driving in one lane with constant speed without shifting gear may be identified as an experienced driver and may not be under high workload, for example.

Vehicle state estimation 336 refers to the vehicle information that may be gathered through different sensors, measuring devices, and control modules employed in the vehicle. Some of the examples of the vehicle state include speed, wheel alignment, fuel, and tire pressure. It should be understood that the safety condition assessment 332 includes identification of any condition or state that may pose safety risks to the passengers in the vehicle. For instance, during high speed driving on a dense traffic area, sudden switch of powertrain mode, steering mode, etc., might reduce vehicle stability. While driving on snow and icy roads, the vehicle is more likely to meet unstable vehicle dynamic conditions that might worsen with switching modes. The safety condition assessment 332 aims to identify those conditions where safe driving might be compromised by mode switching.

Based on the driver, vehicle and surrounding information, the controller 306 identifies a set of driving conditions 326, situations that may potentially require a particular setting for one or more control modules 302. As shown, the driving conditions 326 refer to conditions associated with one of the estimated categories or a combination of the categories. For example, a rough road may be categorized as a driving condition that might demand a comfort setting for the SUM 318 to isolate the vehicle body from the road disturbance, a performance setting for the PCM 314 such that the vehicle has enough power to overcome traction loss due to road roughness. In another implementation, a combination of traffic state and road state may be referred to as a driving condition, which demands several controls to coordinate to certain settings.

As driving conditions 326 keep changing with variations in surroundings, vehicle state, and the driver intent and behavior, subsequently the controller 306 automatically identifies an appropriate drive mode for the current driving condition. It should be understood that the conditions 326 include long term characterization of the associated vehicle subsystems, surroundings, or the driver that may be identified by considering average trends, patterns, or responses experienced. Moreover, these conditions 326 may not be sensitive to the sudden changes in short durations. For example, a long rough road with potholes having small patches of smooth road still will be considered rough road.

In addition, the system 300 includes the safety module 310 that ensures that a selected drive mode is safe for the current or near future driving conditions. In case the driver manually selects a drive mode, which is not deemed as safe based on the estimation from the safety condition assessment 332, the safety module 310 will override the manually selected mode and replace it with a safe mode or prevent the modification of current drive mode. The safety module 310 can also initiate mode modification upon a determination that the current drive mode is not safe when the current driving condition changes. For example, upon heavy traffic detected by the TSE 328, using indications that the adjacent lanes have moving vehicles close to the vehicle, the safety module 310 may modify the setting for the EPASM 312 to minimum assistance mode to discourage the driver to conduct lane changes, namely, the driver needs to apply extra effort to change lanes. This is a precautionary measure to avoid accidents during heavy traffic conditions due to nuisance driver steering wheel angle inputs. The safety module 310 may either switch modes automatically, based on the criticality of the condition, or may prompt the driver to switch to a selected mode.

Once a drive mode is selected manually or through the automatic mode, the mode modification is performed at an appropriate moment. The safety module 310 allows mode modification at the appropriate moment that is safe, based on the driver and vehicle current state. For example, the automatic mode may determine switching the current drive mode to sport mode, however, the safety module 310 may defer this modification if the vehicle is conducting a critical maneuver. Shifting a mode at a critical maneuver might confuse the driver such that the driver misunderstands the driving condition or is distracted to conduct the maneuver. Shifting mode under the other high workload conditions may also distract the driver away from the main task.

Figure 4:
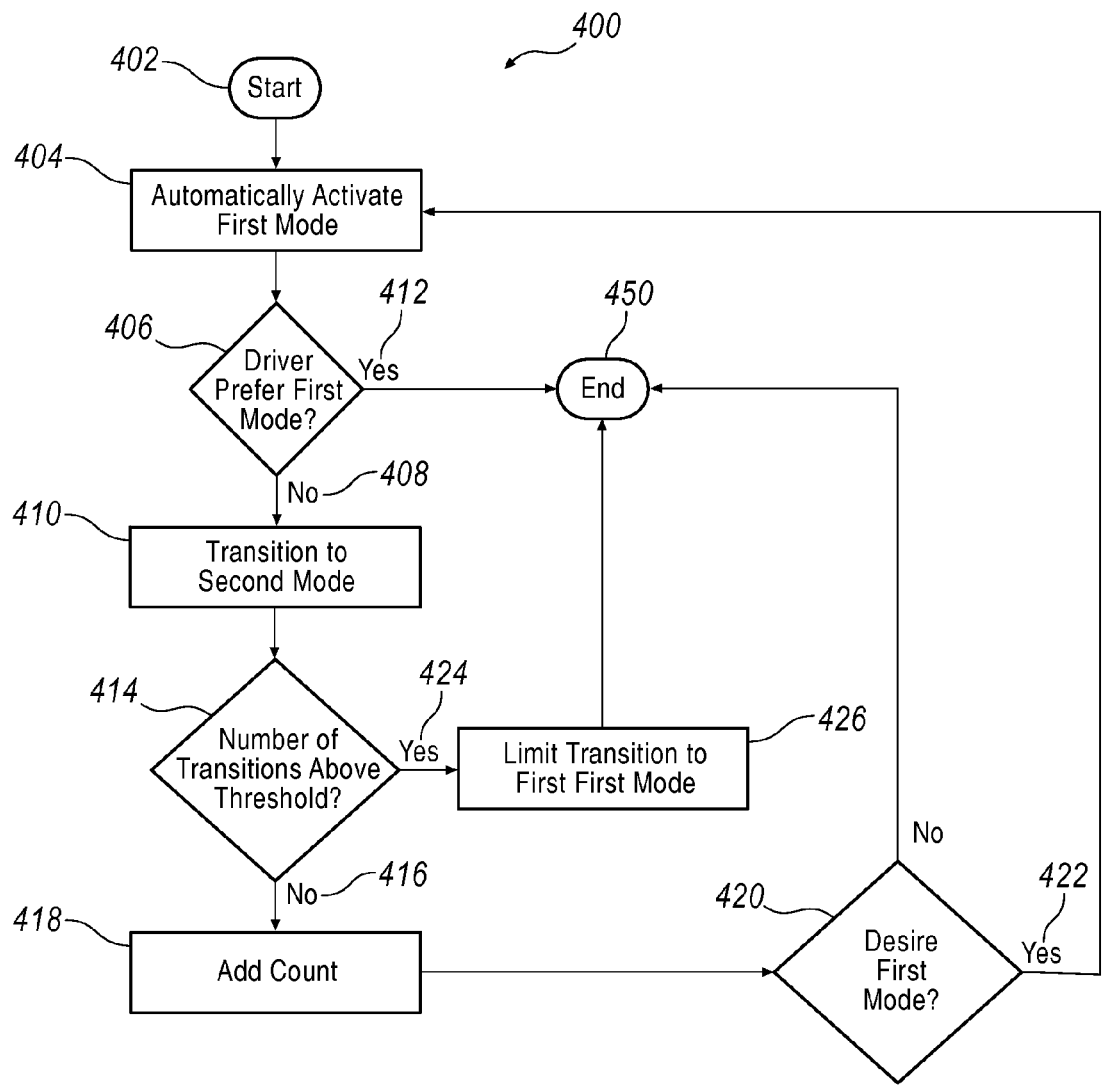
FIG. 4 is a method of controlling a vehicle, according to an embodiment.

Referring to FIG. 4, a method 400 of controlling a vehicle, such as vehicle 10 of FIG. 1, is disclosed. Beginning at step 402, at step 404 a first mode of operation of vehicle 10 is activated. That is, vehicle 10 may be operating in a current mode of operation that may include normal, comfort, or sport modes, as examples and as described above. During operation in one of the modes, it is contemplated that, based on driving habits, conditions, and the like, controller 306 automatically determines the drive mode. At step 406, it is determined whether the driver prefers the automatically activated mode. Thus, if it is determined that the driver does not prefer the automatically activated first mode of operation 408, then, at step 410, the controller 306 automatically transitions to a second mode of operation based on the determination. If it is determined that the driver does prefer the first mode of operation 412, then the process ends 450, and the vehicle remains in the automatically activated first mode until another automatic transition occurs.

At step 414, a count of the number of transitions from first mode to second mode is made. That is, each time that controller 306 makes a transition from first mode to second mode, then the count is incremented and compared to a threshold value. The threshold value may be 3, 5, or 10, as examples, and the number of transitions counted may be constrained to a specific time period, such as one hour. Thus, if the number of transitions is not above a threshold value 416, then a count is added 418 and control moves to step 420 where it is determined whether controller 306 is desired to move to the first mode. If so 422, then control returns to step 404 and the first mode is automatically activated. However, if not, then the process ends at step 450. Further, if at block 414, the number of transitions is greater than or above the threshold 424, then controller 306 limits transitions and, therefore, does not allow the transition to the first mode 426, and the process ends 450.

Thus, the first mode may be automatically activated a number of times, but if it is determined (through the number of transitions being in excess of the threshold) that the driver does not desire the first mode, then the second mode is activated. Thus, as one example, if the first mode is "normal" mode, but the driver is driving as if in "sport" mode (which may be recognized via the driver's use of the accelerator or the brakes, as examples, in a sporty fashion), then the controller recognizes the evident desire to not be in normal mode, and the controller 306 transitions to a second mode, in this case the sport mode. Thus, the sensed behavior of the driver may be inconsistent with the automatically activated first mode of operation, and once a defined or threshold number of transitions occur, the controller will remain in the second mode.

The process may repeat itself, and if the driver repeatedly operates as if in sport mode (which occurs when a number of transitions occur in a given time period) even after automatic transition to the first mode, then the controller will no longer attempt to move to the normal mode because as the threshold value is exceeded, since it is an indication that the driver is dissatisfied with the controller automatic activation of the first mode. Thus, the process 400 limits the number of transitions if it is repeatedly determined that the driver does not prefer the first mode. However, the threshold value that limits the number of transitions is also decremented over time, and as time passes, the count will decrease over the exemplary hour described above. In such fashion, the controller attempts to automatically activate the first mode, but if the driver repeatedly operates the vehicle in a way that is counter to the first mode, then controller 306 will cease attempting to transition until the decremented time (i.e., 1 hour) passes.

In addition, the threshold value itself may be altered with time, as well. Thus, if a number of cycles occur in which the threshold is exceeded (and the controller thereby limits the transition to the first mode), then the controller may also reduce the threshold value that is needed to limit the transition to the first mode. In one example, if the number of cycles occurs to the point where the threshold is exceeded, then it is desirable to reduce the threshold value to stop attempting to move to the first mode, and recognize sooner that the driver desires to stay in the second mode. In such fashion, the threshold value may be changed based on whether the driver is repeatedly dissatisfied with the first mode of operation.

Further, the driver may manually override the automatic activation to the first mode, as well. Thus, if the first mode is automatically activated, and the driver manually moves to the second mode, and if the threshold value of counts is exceeded, then it is evident that the driver desires the second mode and the controller will no longer attempt to automatically activate the first mode. As such, the controller may determine that the driver does not prefer the automatically activated first mode of operation based on whether activation of the first mode of operation is consistently followed by a deactivation of an automatic mode selection or by a manual selection of a mode that is different from the first mode of operation.

Disclosed here is a system in which the system continuously monitors the driver's behavior in the context of the automatic mode activation. If each time there is a change in mode, for example from normal to comfort, the driver's accelerator activity becomes more active, but following a mode change from comfort to normal it becomes less active, after a several iterations, a learning system can learn to identify this pattern and can change a threshold to make it less likely that the system would automatically select comfort mode, or to disable comfort mode activation. This deactivation of a mode can be permanent or temporary, if it prevents activation of the mode for some prescribed period of time, but would allow the mode to be activated again at some time in the future.

Since this type of inferred behavior relies on indirect methods and inference of cause and effect, the disclosed method or algorithm relies on a filtered response, in one embodiment, which works by maintaining a count of the number of transitions between two modes within some configurable period of time. A separate count can be maintained for each possible mode transition. When this count exceeds a pre-established threshold, implying that the transitions are occurring more frequently than expected, the system would infer that the driver was dissatisfied with this particular mode transition. Whenever the driver did not behave differently in response to the automatic mode transition, the count filter would be allowed to slowly decrement the count, using, for instance, a forgetting factor toward zero. The forgetting factor implicitly defines a moving window of length of approximately 1/(1-forgetting factor), in one example. Therefore, the current count is a measure of the frequency of occurrence of an event within the moving window. Whenever this algorithm would infer that the driver was repeatedly dissatisfied by this particular automatic mode transition, when the count exceeds the pre-established threshold, the system would either limit or prohibit this particular transition in the future.

Another more direct method to determine dissatisfaction with an automatic mode activation would be based on whether or not activation of a given mode was consistently followed by the deactivation of either the automatic mode selection system or by the manual selection of another available operating mode by the driver. Learning in this way would be based on more direct feedback about the actual driver preferred mode and could also be based on the driving context, such as the driver doesn't like comfort mode setting invoked on dirt roads but does appreciate it on the highway. The learning system would again monitor the number of these transitions and whenever the count exceeds some pre-established threshold, possibly different from the threshold described above, the automatic performance mode activation system would either temporarily or permanently disable this mode transition in the future.

The disclosed method or algorithm 400 may be implemented in a computing device, such as computer or computing device 24. Computing devices, such as the controller, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed is:

1. A method for controlling a vehicle, comprising:
   automatically activating a first mode of operation of the vehicle;
   counting, with a forgetting factor, a number of transitions to a second mode of operation that occur after automatically activating the first mode of operation; and
   automatically transitioning to the second mode of operation based on the number of transitions exceeding a threshold value indicative of driver dissatisfaction with automatically activating the first mode of operation.

2. The method of claim 1, further comprising automatically transitioning to the second mode based on behavior of a driver that is inconsistent with the automatically activated first mode of operation.

3. The method of claim 1, further comprising inhibiting a switch to the first mode of operation when the threshold value is exceeded.

4. The method of claim 1, further comprising changing the threshold value based on whether a driver is repeatedly dissatisfied with the first mode of operation.

5. The method of claim 1, further comprising automatically transitioning to the second mode of operation based on whether activation of the first mode of operation is consistently followed by a deactivation of an automatic mode selection or by a manual selection of a mode that is different from the first mode of operation.

6. The method of claim 1, further comprising automatically transitioning to the second mode of operation based on whether a driver operates an accelerator in a manner that is inconsistent with the first mode of operation.

7. The method of claim 1, wherein the first mode of operation and the second mode of operation are each one of a normal mode, a comfort mode, and a sport mode.

8. A mode-shifting system for a vehicle, comprising a controller configured to:
   automatically establish a mode of operation;
   count, with a forgetting factor, a number of transitions to a different mode of operation that occur after automatically establishing the mode of operation; and
   automatically switch to the different mode in response to the number of transitions exceeding a threshold value indicative of driver dissatisfaction with the automatically established mode of operation.

9. The system of claim 8, wherein the controller is further configured to automatically switch to the different mode of operation based on driver behavior that is inconsistent with the automatically established mode of operation.

10. The system of claim 8, wherein the controller is further configured to inhibit automatically establishing the mode of operation when the threshold value is exceeded.

11. The system of claim 8, wherein the controller is further configured to change the threshold value based on whether a driver is repeatedly dissatisfied with the automatically established mode of operation.

12. The system of claim 8, wherein the controller is further configured to automatically switch to the different mode of operation based on whether establishment of the mode of operation is consistently followed by a deactivation of an automatic mode selection or by a manual selection of a mode that is different from the automatically established mode of operation.

13. The system of claim 8, wherein the controller is further configured to automatically switch to the different mode of operation based on whether a driver operates an accelerator in a manner that is inconsistent with the first mode of operation.

14. A non-transitory computer-readable medium tangibly embodying computer-executable instructions comprising:
- automatically activating a first mode of operation of a vehicle;
- counting, with a forgetting factor, a number of transitions to a second mode of operation that occur after automatically activating the first mode of operation; and
- automatically transitioning to the second mode of operation based on the number of transitions exceeding a threshold value indicative of driver dissatisfaction with automatically activating the first mode.

15. The computer-readable medium of claim 14, the instructions further comprising automatically transitioning to the second mode of operation based on driver behavior that is inconsistent with the automatically activated first mode of operation.

16. The computer-readable medium of claim 14, the instructions further comprising automatically transitioning to the second mode of operation based on whether activation of the first mode of operation is consistently followed by a deactivation of an automatic mode selection or by a manual selection of a mode that is different from the first mode of operation.

17. The computer-readable medium of claim 14, the instructions further comprising automatically transitioning to the second mode of operation based on whether a driver operates an accelerator in a manner that is inconsistent with the first mode of operation.

* * * * *